(12) United States Patent
Cho

(10) Patent No.: US 11,565,677 B2
(45) Date of Patent: Jan. 31, 2023

(54) ELECTRIC BRAKE SYSTEM AND CONTROLLING METHOD THEREOF

(71) Applicant: MANDO CORPORATION, Gyeonggi-do (KR)

(72) Inventor: Youngeun Cho, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 237 days.

(21) Appl. No.: 16/296,092

(22) Filed: Mar. 7, 2019

(65) Prior Publication Data
US 2019/0275996 A1 Sep. 12, 2019

(30) Foreign Application Priority Data
Mar. 8, 2018 (KR) .................. 10-2018-0027370

(51) Int. Cl.
*B60T 13/74* (2006.01)
*B60L 15/20* (2006.01)
(Continued)

(52) U.S. Cl.
CPC .............. *B60T 13/745* (2013.01); *B60L 7/26* (2013.01); *B60L 15/2009* (2013.01); *B60T 7/042* (2013.01); *B60T 8/1761* (2013.01); *B60T 8/17616* (2013.01); *B60T 8/326* (2013.01); *B60T 8/4004* (2013.01); *B60T 10/02* (2013.01); *B60T 8/4266* (2013.01); *B60T 2201/122* (2013.01); *B60T 2210/10* (2013.01); *B60T 2210/32* (2013.01)

(58) Field of Classification Search
CPC ...... B60T 7/042; B60T 13/745; B60T 8/4266; B60T 8/447; B60T 7/06; B60T 8/17616; B60T 8/326; B60T 8/442; B60T 8/4809; B60T 8/4827; B60T 8/4836; B60T 8/1761; B60T 8/4004; B60T 10/02; B60T 2201/122; B60T 2210/10; B60T 2210/32; B60L 7/26; B60L 15/2009
See application file for complete search history.

(56) References Cited

U.S. PATENT DOCUMENTS 4,850,650 A * 7/1989 Eckert ................... B60T 8/1766
303/9.62
5,558,409 A * 9/1996 Walenty .................. B60T 7/042
303/10
(Continued)

FOREIGN PATENT DOCUMENTS

JP 2004050905 A * 2/2004 ............ B60T 13/741
JP 2004286054 A * 10/2004 ............ B60T 13/741
(Continued)

*Primary Examiner* — Robert A. Siconolfi
*Assistant Examiner* — Mahbubur Rashid
(74) *Attorney, Agent, or Firm* — Ladas & Parry, LLP

(57) ABSTRACT

Disclosed herein is an electric brake system including: a hydraulic feeder configured to move a piston forward or backward according to a pedal effort from a brake pedal to discharge oil; a motor position sensor configured to measure a position of the piston; and a controller configured to control, when an Anti-lock Brake System (ABS) control starts, a change in direction of the piston based on predicted displacement information of the piston while the ABS control is performed such that the piston is at a target position at target vehicle speed.

12 Claims, 9 Drawing Sheets

(51) Int. Cl.
  *B60T 8/1761* (2006.01)
  *B60L 7/26* (2006.01)
  *B60T 10/02* (2006.01)
  *B60T 8/40* (2006.01)
  *B60T 7/04* (2006.01)
  *B60T 8/32* (2006.01)
  *B60T 8/42* (2006.01)

(56) References Cited

U.S. PATENT DOCUMENTS

| | | | | |
|---|---|---|---|---|
| 5,570,935 A * | 11/1996 | Monzaki | ............ | B60T 8/17636 303/155 |
| 5,711,582 A * | 1/1998 | Koike | ............ | B60T 8/341 303/11 |
| 5,957,246 A * | 9/1999 | Suzuki | ............ | B60T 13/741 188/72.1 |
| 6,267,454 B1 * | 7/2001 | Takahashi | ............ | B60T 7/042 303/186 |
| 7,980,638 B2 * | 7/2011 | Matsuzaki | ............ | B60T 7/122 303/114.1 |
| 8,348,352 B2 * | 1/2013 | Nishino | ............ | B60T 8/442 303/122.05 |
| 8,447,487 B2 * | 5/2013 | Nishino | ............ | B60T 13/142 701/78 |
| 2003/0020327 A1 * | 1/2003 | Isono | ............ | B60T 8/4018 303/113.4 |
| 2009/0032342 A1 * | 2/2009 | Yamaguchi | ............ | F16D 65/18 188/72.3 |
| 2009/0045672 A1 * | 2/2009 | Nishino | ............ | B60T 8/88 303/113.3 |
| 2009/0183958 A1 * | 7/2009 | Sano | ............ | B60T 8/00 188/204 R |
| 2009/0261649 A1 * | 10/2009 | Higuma | ............ | B60T 8/4872 303/113.3 |
| 2011/0049971 A1 * | 3/2011 | Sano | ............ | B60T 8/3265 303/6.01 |
| 2011/0060511 A1 * | 3/2011 | Kim | ............ | B60T 13/741 701/74 |
| 2011/0073419 A1 * | 3/2011 | Matsuzaki | ............ | B60T 13/142 188/106 P |
| 2012/0073285 A1 * | 3/2012 | Sakuma | ............ | B60T 11/232 60/538 |
| 2012/0102940 A1 * | 5/2012 | Ueno | ............ | B60T 8/441 60/537 |
| 2012/0102941 A1 * | 5/2012 | Yamada | ............ | B60T 13/745 60/545 |
| 2013/0025273 A1 * | 1/2013 | Nozawa | ............ | B60T 7/042 60/545 |
| 2013/0080016 A1 * | 3/2013 | Bohn | ............ | B60T 13/662 701/78 |
| 2013/0213025 A1 * | 8/2013 | Linden | ............ | B60T 8/4031 60/327 |
| 2017/0203740 A1 * | 7/2017 | Yamaguchi | ............ | B60T 13/745 |
| 2017/0210369 A1 * | 7/2017 | Lim | ............ | B60T 7/042 |
| 2017/0327097 A1 * | 11/2017 | Saito | ............ | B60T 13/686 |

FOREIGN PATENT DOCUMENTS

| | | | | |
|---|---|---|---|---|
| JP | | 3837195 B2 * | 10/2006 | ............ B60T 13/741 |
| JP | | 2014-201200 | 10/2014 | |
| KR | | 10-2016-0054106 | 5/2016 | |

* cited by examiner

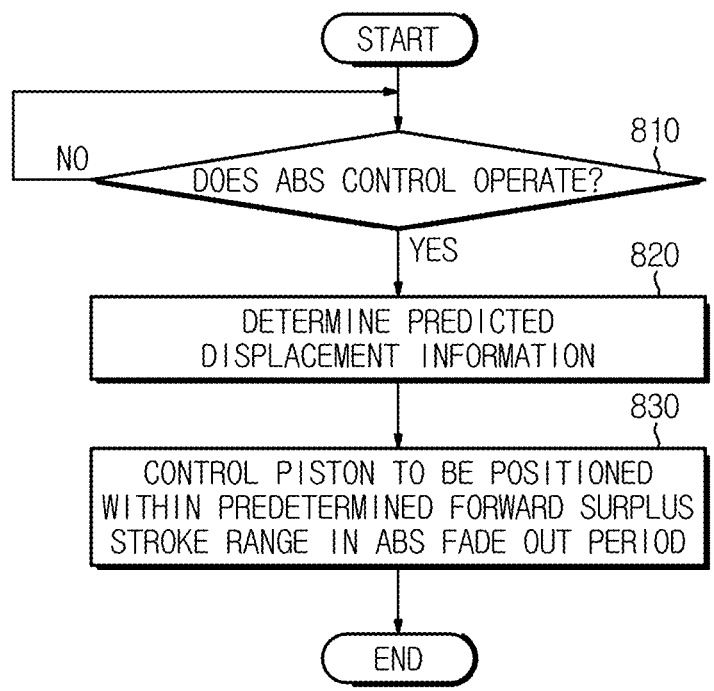

ELECTRIC BRAKE SYSTEM AND CONTROLLING METHOD THEREOF

CROSS-REFERENCE TO RELATED APPLICATION

This application is based on and claims priority under 35 U.S.C. § 119 to Korean Patent Application No. 10-2018-0027370, filed on Mar. 8, 2018 in the Korean Intellectual Property Office, the disclosure of which is incorporated by reference herein in its entirety.

BACKGROUND

1. Field

The present disclosure relates to an electric brake system, and more particularly, to an electric brake system of generating a braking force by using an electric signal corresponding to a displacement of a brake pedal.

2. Description of the Related Art

Recently, various kinds of brake systems are being proposed to obtain a robust, stable braking force. Examples of such brake systems are an anti-lock brake system (ABS) for preventing wheels from slipping upon braking, a brake traction control system (BTCS) for preventing driving wheels from slipping upon sudden start or sudden acceleration of a vehicle, an electronic stability control (ESC) system for securing the driving stability of a vehicle by combining the ABS with the BTCS to control brake fluid pressure, etc.

In general, electric brake systems include a hydraulic feeding apparatus for receiving, when a driver presses the brake pedal, the driver's braking intention as an electric signal from the pedal displacement sensor sensing a displacement of the brake pedal and supplying pressure to the wheel cylinder.

The hydraulic feeding apparatus generates a braking force by driving a motor according to the pedal effort of the brake pedal, wherein the braking force is generated when the torque of the motor is converted into a straight-line motion to press a hydraulic piston.

SUMMARY

Therefore, it is an aspect of the present disclosure to provide an electric brake system capable of changing a movement direction of a piston when an anti-lock brake system (ABS) is operating, and a method of controlling the electric brake system.

Additional aspects of the disclosure will be set forth in part in the description which follows and, in part, will be obvious from the description, or may be learned by practice of the disclosure.

In accordance with an aspect of the present disclosure, an electric brake system includes: a hydraulic feeder configured to move a piston forward or backward according to a pedal effort from a brake pedal to discharge oil; a motor position sensor configured to measure a position of the piston; and a controller configured to control, when an Anti-lock Brake System (ABS) control starts, a change in direction of the piston based on predicted displacement information of the piston while the ABS control is performed such that the piston is at a target position at target vehicle speed.

Also, when the ABS control starts, the controller may determine a total stroke value of the piston for a time period from when the ABS control starts to when the ABS control terminates, as the predicted displacement information.

Also, the controller may calculate a position trajectory of the piston according to vehicle speed based on the predicted displacement information, and control the change in direction of the piston based on the position trajectory of the piston such that the piston is at the target position at the target vehicle speed.

Also, the controller may determine the predicted displacement information of the piston based on the measured position of the piston and the sensed vehicle speed.

Also, the controller may determine the predicted displacement information of the piston, based on a change in position of the piston measured for a predetermined unit time and a change in vehicle speed sensed for the predetermined unit time.

Also, the controller may control the piston to change a movement direction lastly earlier than a predetermined time before the ABS control terminates.

Also, the controller may control the piston such that the piston is positioned within a predetermined forward surplus stroke range at the predetermined time.

Also, the controller may control the piston to move in one direction of forward or backward until the ABS control terminates from the predetermined time.

In accordance with another aspect of the present disclosure, a method of controlling an electric brake system includes: sensing vehicle speed; measuring a position of a piston; determining predicted displacement information of the piston while an Anti-lock Brake System (ABS) control is performed; determining target vehicle speed and a target position of the piston; and controlling the piston based on the predicted displacement information such that the piston is at the target position at the target vehicle speed.

Also, the determining of the predicted displacement information of the piston may include determining, when the ABS control starts, a total stroke value of the piston for a time period from when the ABS control starts to when the ABS control terminates, as the predicted displacement information.

Also, the controlling of the piston may include: calculating a position trajectory of the piston according to vehicle speed based on the predicted displacement information; and controlling a change in direction of the piston based on the position trajectory of the piston such that the piston is at the target position at the target vehicle speed.

Also, the determining of the predicted displacement information of the piston may include determining the predicted displacement information of the piston based on the measured position of the piston and the sensed vehicle speed.

Also, the determining of the predicted displacement information of the piston may include determining the predicted displacement information of the piston based on a change in position of the piston measured for a predetermined unit time and a change in vehicle speed sensed for the predetermined unit time.

Also, the controlling of the piston may include controlling the piston to change a movement direction lastly earlier than a predetermined time before the ABS control terminates.

Also, the controlling of the piston may include controlling the piston such that the piston is positioned within a predetermined forward surplus stroke range at the predetermined time.

Also, the controlling of the piston may include controlling the piston to move in one direction of forward or backward until the ABS control terminates from the predetermined time.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 6 is a flowchart showing a method of controlling an electric brake system according to an embodiment of the disclosure.

DETAILED DESCRIPTION

Figure 1:
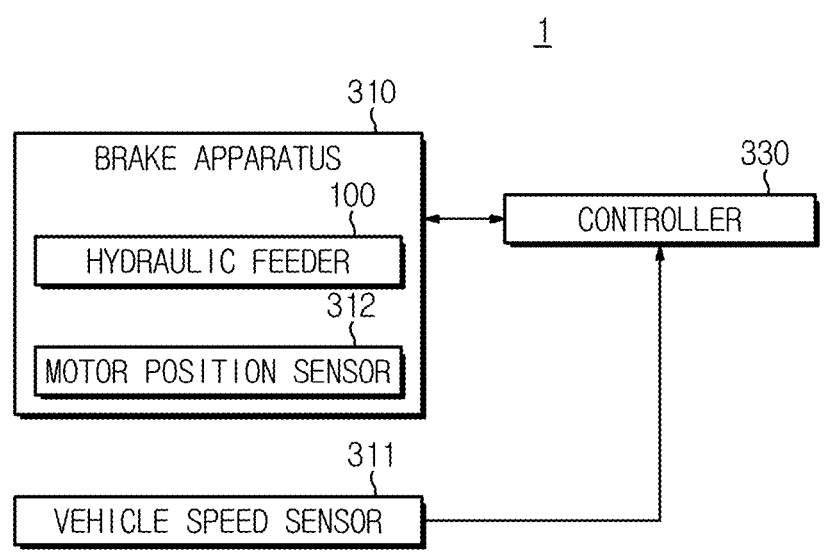
FIG. 1 is a block diagram showing a configuration of an electric brake system according to an embodiment of the disclosure.

Hereinafter, like reference numerals will refer to like components throughout this specification. This specification does not describe all components of the embodiments, and general information in the technical field to which the present disclosure belongs or overlapping information between the embodiments will not be described. As used herein, the terms "portion", "part, "module, "member" or "block" may be implemented as software or hardware, and according to embodiments, a plurality of "portions", "parts, "modules, "members" or "blocks" may be implemented as a single component, or a single "portion", "part, "module, "member" or "block" may include a plurality of components.

It will be understood that when a component is referred to as being "connected" to another component, it can be directly or indirectly connected to the other component. When a component is indirectly connected to another component, it may be connected to the other component through a wireless communication network.

Also, it will be understood that when the terms "includes," "comprises," "including," and/or "comprising," when used in this specification, specify the presence of a stated component, but do not preclude the presence or addition of one or more other components.

Also, it will be understood that, although the terms first, second, etc. may be used herein to describe various components, these components should not be limited by these terms. These terms are only used to distinguish one component from another.

It is to be understood that the singular forms "a," "an," and "the" include plural referents unless the context clearly dictates otherwise.

Reference numerals used in operations are provided for convenience of description, without describing the order of the operations, and the operations can be executed in a different order from the stated order unless a specific order is definitely specified in the context.

Hereinafter, an operation principle and embodiments of the disclosure will be described with reference to the accompanying drawings.

FIG. 1 is a block diagram showing a configuration of an electric brake system according to an embodiment of the disclosure.

Referring to FIG. 1, an electric brake system 1 according to an embodiment of the disclosure may include a brake apparatus 310 for generating a braking force, a vehicle speed sensor 311, and a controller 330 for controlling the brake apparatus 310. The brake apparatus 310 may include a hydraulic feeder 100 and a motor position sensor 312.

The hydraulic feeder 100 may operate mechanically by receiving a driver's braking intention as an electric signal from a pedal displacement sensor sensing a displacement of a brake pedal 10, and move a hydraulic piston (114 of FIG. 4) forward or backward according to the pedal effort of the brake pedal 10 to thereby discharge oil.

Figure 4:
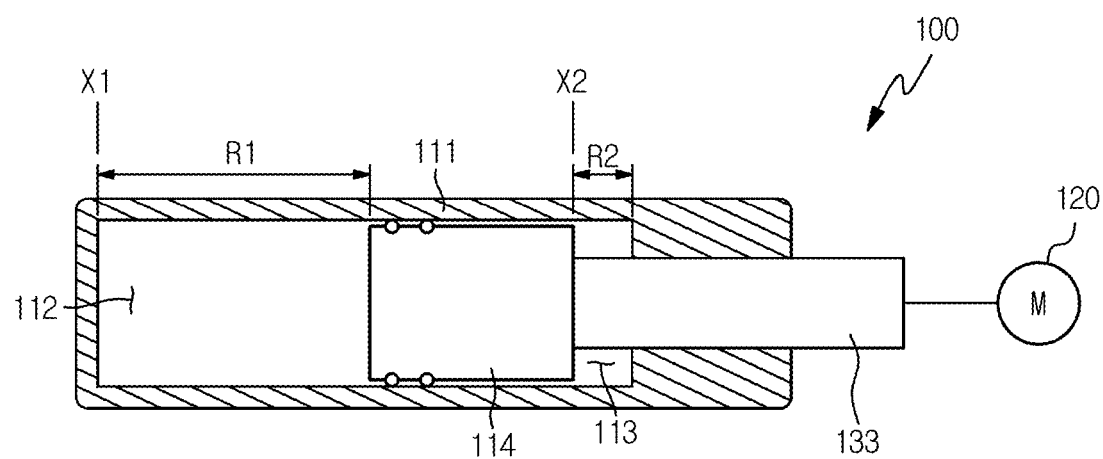
FIG. 4 is a hydraulic circuit diagram showing a brake apparatus of an electric brake system according to an embodiment of the disclosure.

For this, the hydraulic feeder 100 may include the hydraulic piston 114 that is slidable forward or backward in a cylinder block 111, as shown in FIG. 4. The hydraulic piston 114 may move backward to generate fluid pressure in a first pressure chamber 112, and move forward to generate fluid pressure in a second pressure chamber 113.

Also, the hydraulic feeder 100 may include a hydraulic providing unit (not shown) for providing oil pressure to be transferred to a wheel cylinder (not shown), a motor (120 of FIG. 4) for generating torque by an electric signal of the pedal displacement sensor (not shown), and a power converter (not shown) for converting a rotary motion of the motor 120 into a straight-line motion and providing the straight-line motion to the hydraulic providing unit. Also, the hydraulic providing unit may operate by pressure provided from a high-pressure accumulator, instead of a driving force supplied from the motor 120.

The power converter may convert torque into a straight-line motion, and include, for example, a driving shaft 133. Also, the power converter may further include a worm shaft and a worm wheel. In this case, the worm shaft may be integrated into the shaft of the motor 120, and on a circumferential surface of the worm shaft, a worm may be formed to be engaged with the worm wheel, thereby rotating the worm wheel. The worm wheel may be engaged with the driving shaft 133, and move the driving shaft 133 in a straight line. The driving shaft 133 may be connected to the hydraulic piston 114 to cause the hydraulic piston 114 to slide in the cylinder block 111.

In other words, when the motor 120 is driven in correspondence to the generation of a displacement of the brake pedal 10, the torque of the motor 120 may be transferred to the driving shaft 133 via the worm shaft and the worm wheel to move the hydraulic piston 114 connected to the driving shaft 133 forward or backward. For this, the hydraulic feeder 100 may further include an electronic control unit (not shown), and the electronic control unit may receive an electric signal output from the pedal displacement sensor to drive the motor 120.

The electronic control unit may be implemented with a memory (not shown) storing data for algorithms for controlling operations of components in the hydraulic feeder 100 or for programs embodying the algorithms, and a processor (not shown) that performs the above-described operations by using the data stored in the memory. The memory and the processor may be implemented as separate chips or integrated into a single chip.

Meanwhile, the hydraulic feeder 100 of the electric brake system 1 according to an embodiment of the disclosure may operate by a double-acting method. However, the hydraulic feeder 100 may operate by a single-acting method.

The motor position sensor 312 may sense a position of the motor 120, and also sense a position of the hydraulic piston 114. Thereby, the motor position sensor 312 may measure a position value of the hydraulic piston 114, that is, a stroke value. The motor position sensor 312 may include a motor control sensor.

A position (that is, a stroke value) of the hydraulic piston 114, measured by the motor position sensor 312, may be a basis for the control of the controller 330 which will be described later.

The brake apparatus 310 may adjust oil pressure in a brake circuit to prevent vehicle wheels from being locked when a driver stops the vehicle 1 suddenly. For this, the brake apparatus 310 may control braking pressure according to adhesion between tires and a road. That is, the brake apparatus 310 may perform an ABS control.

The vehicle speed sensor 311 may sense speed of the vehicle 1, that is, speed of the vehicle wheels. The vehicle speed sensor 311 may be a reed switch type speed sensor, a photoelectric type speed sensor, an electronic type speed sensor, etc., although not limited thereto. The controller 330 may control various components of the electric brake system 1, particularly, various components included in the brake apparatus 310 described above.

When an ABS control starts, the controller 330 may control a forward or backward movement of the hydraulic piston 114 such that a stroke value of the hydraulic piston 114 is within a proper range which will be described later.

Also, the controller 330 may control the hydraulic piston 114 to change its movement direction from forward to backward or from backward to forward.

For this, when an ABS control starts, the controller 330 may determine predicted displacement information of the hydraulic piston 114, while the ABS control is performed. The predicted displacement information may be information about a total movement amount of the hydraulic piston 114, which is predicted while the ABS control is performed. The predicted displacement information may include information about a total stroke value of the hydraulic piston 114 while the ABS control is performed.

More specifically, when an ABS control starts, the controller 330 may determine a total stroke value for a time period from when the ABS control starts to when the ABS control terminates. The controller 330 may determine the total stroke value as predicted displacement information.

Also, the controller 330 may determine a stroke value range at a predetermined time based on the total stroke value, and control the hydraulic piston 114 such that a stroke value of the hydraulic piston 114 at the predetermined time is included in the stroke value range.

For example, the controller 330 may control the hydraulic piston 114 to be positioned within a predetermined forward surplus stroke range (R1 of FIG. 4) at a predetermined time.

For this, the controller 330 may be implemented with a memory (not shown) storing data for algorithms for controlling operations of components in the electric brake system 1 or for programs embodying the algorithms, and a processor (not shown) that performs the above-described operations by using the data stored in the memory. The memory and the processor may be implemented as separate chips or integrated into a single chip. The controller 330 may be implemented as a chip that is separated from the processor described above in regard of the electronic control unit of the hydraulic feeder 100, or the controller 330 and the processor may be integrated into a single chip.

Meanwhile, at least one component may be added or omitted in correspondence to the performance of components of the electric brake system 1 or the brake apparatus 310 shown in FIG. 1. Also, it will be understood by one of ordinary skill in the art that the relative positions of the components may change in correspondence to the performance or structure of the system.

Meanwhile, each of the components shown in FIG. 1 may be a software component, and/or a hardware component, such as Field Programmable Gate Array (FPGA) and Application Specific Integrated Circuit (ASIC).

Hereinafter, operations of the controller 330 in the electric brake system 1 according to an embodiment of the disclosure will be described in detail with reference to FIGS. 2 to 6.

Figure 2:
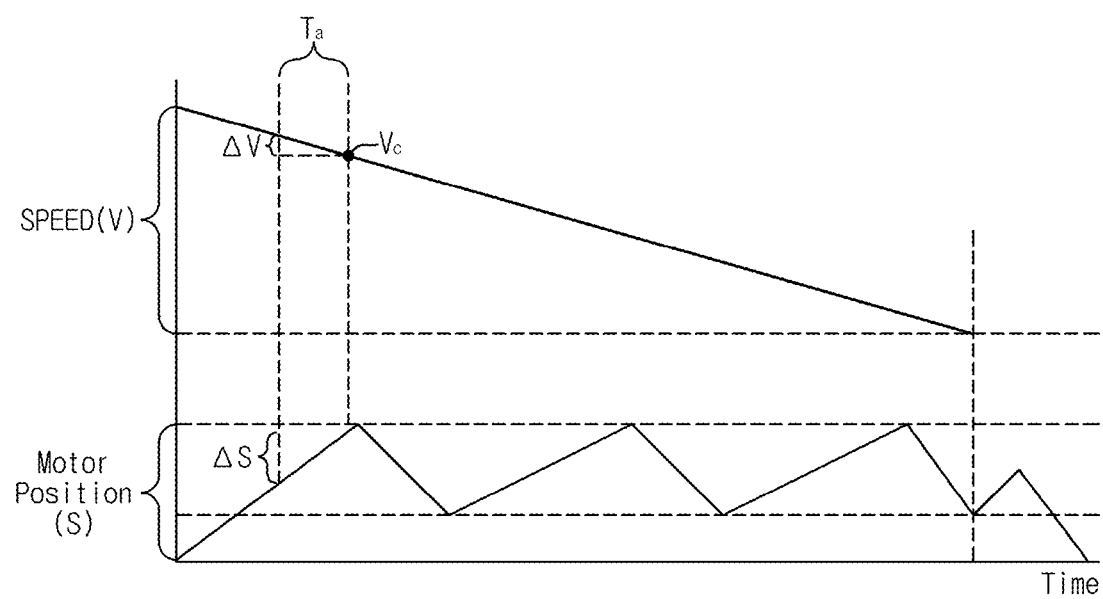
FIG. 2 is a view for describing an operation of determining a total stroke value of an electric brake system according to an embodiment of the disclosure.
Figure 3:
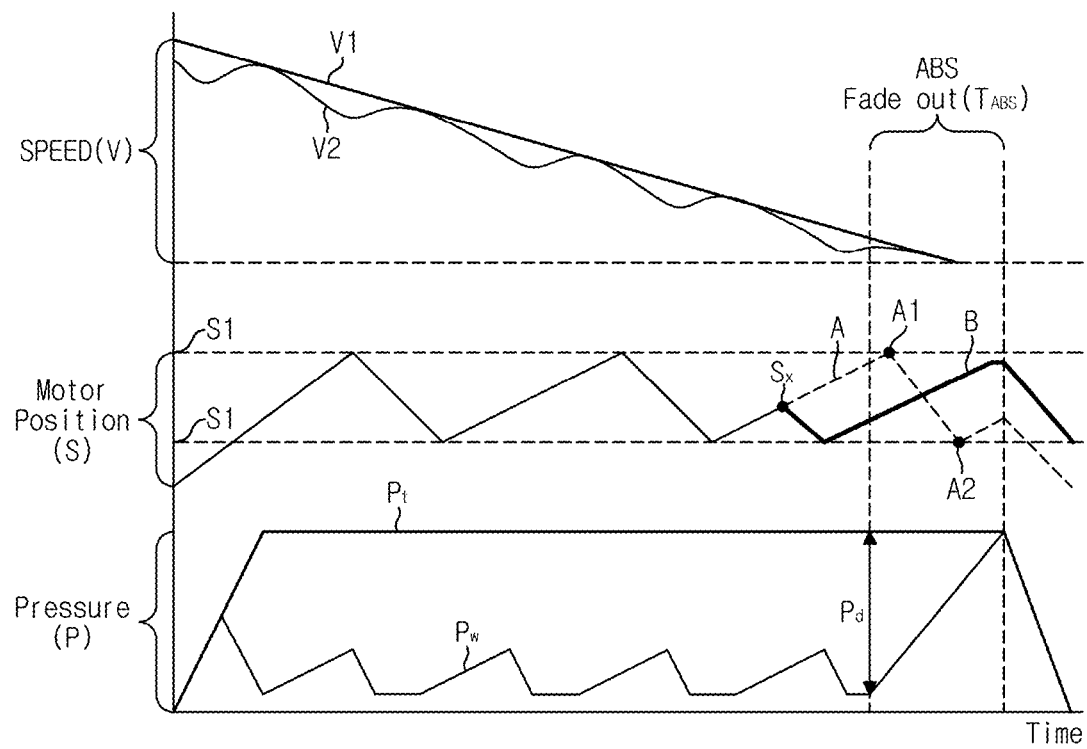
FIG. 3 is a view for describing a method of controlling an electric brake system according to an embodiment of the disclosure.

FIG. 2 is a view for describing an operation of determining a total stroke value of the electric brake system 1 according to an embodiment of the disclosure, FIG. 3 is a view for describing a method of controlling the electric brake system 1 according to an embodiment of the disclosure, FIG. 4 is a hydraulic circuit diagram showing the brake apparatus 310 of the electric brake system 1 according to an embodiment of the disclosure, and FIGS. 5A to 5D show an example of an operation of changing a movement direction of the hydraulic piston 114 of the electric brake system 1.

As described above, when an ABS control starts, the controller 330 may determine a total stroke value of the hydraulic piston 114 for a time period from when the ABS control starts to when the ABS control terminates.

More specifically, the controller 330 may determine a total stroke value of the hydraulic piston 114, based on a change in stroke values of the hydraulic piston 114 measured for a predetermined unit time and a change in vehicle speed sensed for the predetermined unit time.

In a graph of FIG. 2, the x-axis represents time, and the y-axis represents speed V of the vehicle 1 and motor position S.

The controller 330 may determine a total stroke value of the hydraulic piston 114 for a time period from when an ABS control starts to when the ABS control terminates, that is, while the ABS control is performed, by using a change $\Delta S$ in stroke values for a unit time Ta, a change $\Delta V$ in vehicle speed for the unit time Ta, and vehicle speed Vc sensed currently.

More specifically, the controller 330 may calculate a total stroke value that is to be consumed for the time period from when the ABS control starts to when the ABS control terminates, by Equation 1 below.

$$\text{Total Stroke} = \Delta S \cdot \left(\frac{V_c}{\Delta V}\right), \quad \text{Equation 1}$$

where $\Delta S$ represents a change in stroke values, Vc represents current vehicle speed, and $\Delta V$ represents a change in vehicle speed.

The controller 330 may determine a total stroke value by Equation 1, and the total stroke value may be used to determine a stroke value range of the hydraulic piston 114 at a predetermined time.

The controller 330 may determine a stroke value range at a predetermined time based on the total stroke value, and control the hydraulic piston 114 such that a stroke value of the hydraulic piston 114 at the predetermined time is included in the stroke value range.

In graphs of FIG. 3, the x-axis represents time, and the y-axes represent speed V, motor position S, and pressure P, respectively. The respective graphs represent speed V, motor position S, and pressure P for a time period from when an ABS control starts to when the ABS control terminates.

In the electric brake system 1 according to an embodiment of the disclosure, when an ABS control starts, vehicle speed V1 and wheel speed V2 may start decreasing.

In this case, a stroke value of the hydraulic piston 114 may be between a maximum stroke value S1 and a stroke value S2 at which remaining pressure may be released. When the stroke value of the hydraulic piston 114 is the maximum stroke value S1, the position of the hydraulic piston 114 towards the first pressure chamber 112 may be a forward limit stroke position (X1 of FIG. 4). Also, when the stroke value of the hydraulic piston 114 is the stroke value S2 at which remaining pressure may be released, the position of the hydraulic piston 114 towards the second pressure chamber 113 may be a backward limit stroke position (X2 of FIG. 4).

Meanwhile, as shown in FIG. 4, a member for preventing the flow of fluid pressure between the first pressure chamber 112 and the second pressure chamber 113 may be installed on the hydraulic piston 114. However, the member may be installed on the cylinder block 111, instead of the hydraulic piston 114.

The controller 330 may control the hydraulic piston 114 to move forward, and when the stroke value of the hydraulic piston 114 reaches the maximum stroke value S1, the controller 330 may control the hydraulic piston 114 to move backward. In this case, the hydraulic piston 114 may change its movement direction from forward to backward.

Also, the controller 330 may control the hydraulic piston 114 to move backward, and when the stroke value of the hydraulic piston 114 reaches the stroke value S2 at which remaining pressure may be released, the controller 330 may control the hydraulic piston 114 to move forward. In this case, the hydraulic piston 114 may change its movement direction from backward to forward.

In FIG. 3, A represents a stroke value of a typical hydraulic piston when an ABS control is performed, and B represents a stroke value of the hydraulic piston 114 in the electric brake system 1 according to an embodiment of the disclosure.

Referring to A of FIG. 3, typically, because higher pressure is required at a greater difference Pd between wheel pressure Pw and target pressure Pt when the wheel pressure Pw converges on the target pressure Pt in a last period of an ABS control, that is, in an ABS Fade out period TABS, the movement direction of the hydraulic piston may change (A1, A2).

Referring to B of FIG. 3, the controller 330 may control a movement of the hydraulic piston 114 such that the movement direction of the hydraulic piston 114 does not change in the ABS Fade out period TABS, that is, for a time period from a predetermined time T1 to an ABS control end time T2.

More specifically, the controller 330 may control the hydraulic piston 114 to move in one direction of forward or backward for the time period from the predetermined time T1 to the ABS control end time T2.

For this, the controller 330 may control the hydraulic piston 114 to change its movement direction lastly before the predetermined time T1 such that a stroke value Sz of the hydraulic piston 114 at the predetermined time T1 is included in a predetermined range.

In this case, when a stroke value of the hydraulic piston 114 is a first stroke value Sx, the controller 330 may control the hydraulic piston 114 to change its movement direction in advance, and when a stroke value of the hydraulic piston 114 is a stroke value Sy at which pressure may be released, the controller 330 may control the hydraulic piston 114 to change its movement direction lastly.

Figure 5A:
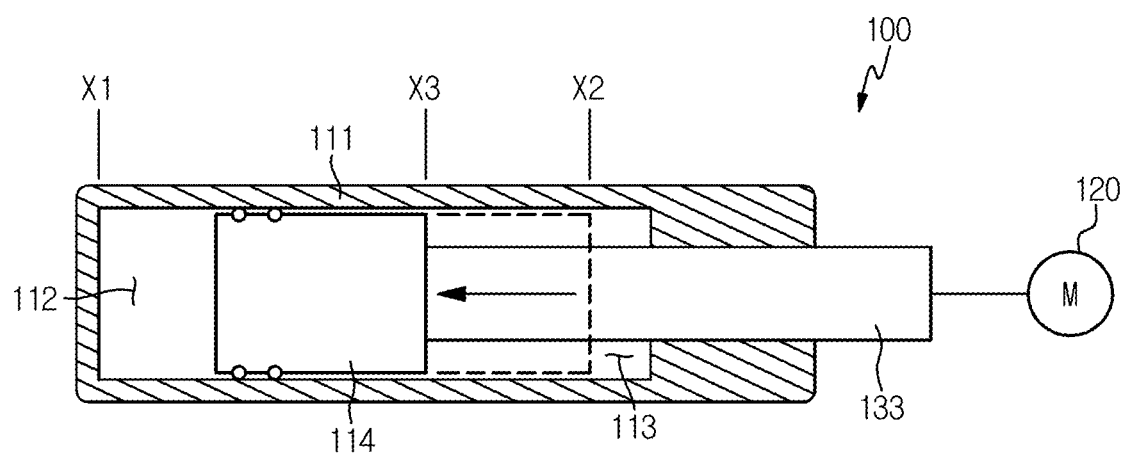
FIGS. 5A to 5D show an example of an operation of changing a movement direction of a hydraulic piston of an electric brake system according to an embodiment of the disclosure.
Figure 5B:
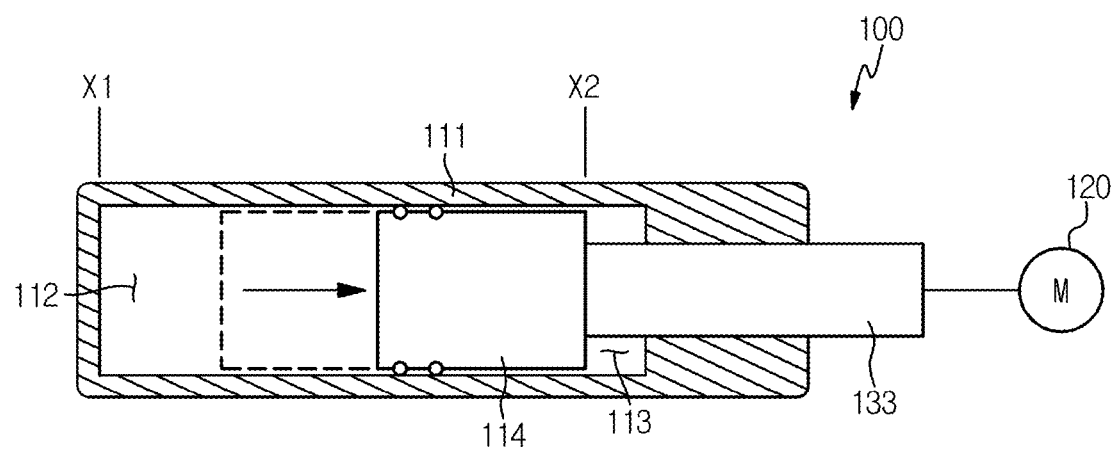

For example, as shown in FIG. 5A, when the hydraulic piston 114 moves forward from the position X2 at which the stroke value of the hydraulic piston 114 is the stroke value S2 at which remaining pressure may be released, and then the hydraulic piston 114 arrives at a position X3 at which the stroke value of the hydraulic piston 114 is the first stroke value Sx, the controller 330 may control the hydraulic piston 114 to move backward from the position X3 at which the stroke value of the hydraulic piston 114 is the first stroke value Sx. In this case, as shown in FIG. 5B, the hydraulic piston 114 may move backward to the position X2 at which the stroke value of the hydraulic piston 114 is the stroke value S2 at which remaining pressure may be released, under the control of the controller 330.

Figure 5C:
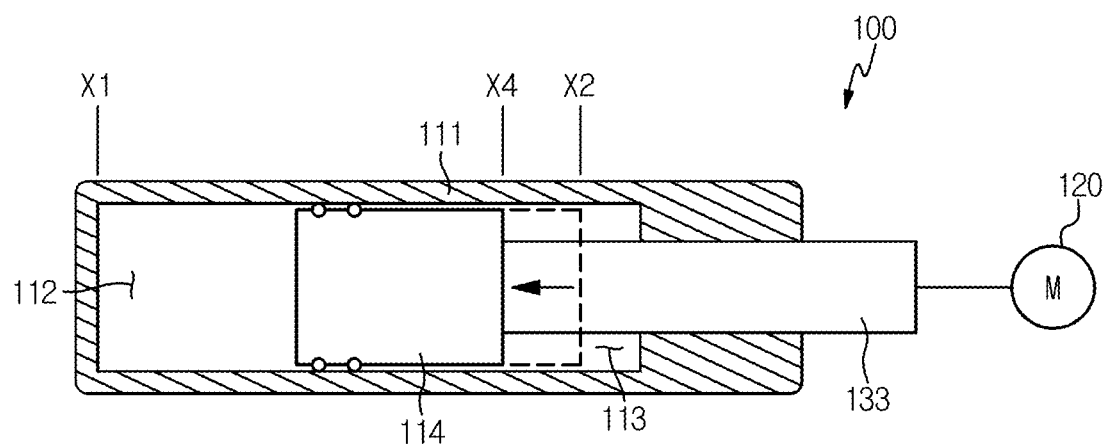

Thereafter, as shown in FIG. 5C, when the hydraulic piston 114 arrives at the position X2 at which the stroke value of the hydraulic piston 114 is the stroke value S2 at which remaining pressure may be released, the hydraulic piston 114 may again move forward. In this case, the controller 330 may control a movement of the hydraulic piston 114 such that the position of the hydraulic piston 114 at the predetermined time T1 is a position X4 at which the hydraulic piston 114 has a stroke value Sz included in a predetermined range.

Figure 5D:
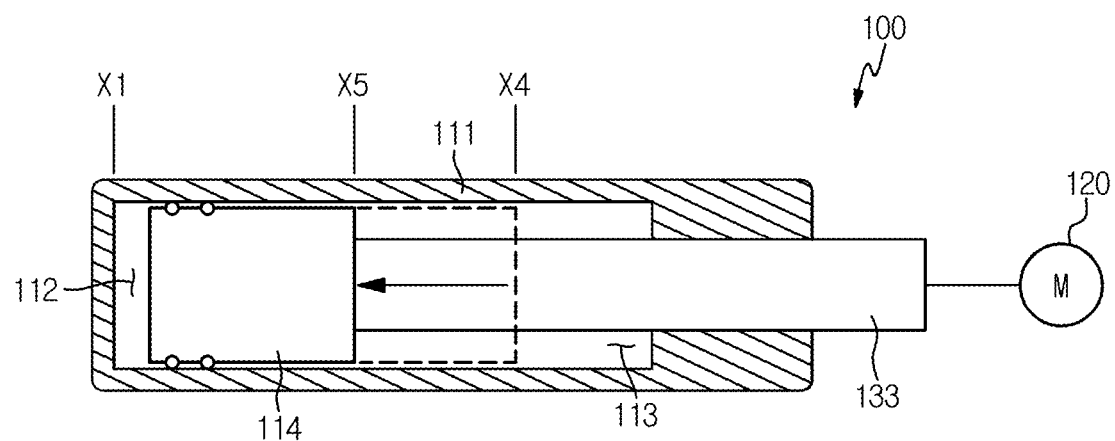

As shown in FIG. 5D, the hydraulic piston 114 may continue to move forward based on the control of the controller 330, and at the ABS control end time T2, the hydraulic piston 114 may be at a position X5 at which the hydraulic piston 114 has a stroke value that is equal to or smaller than the forward limit stroke value S1. That is, the hydraulic piston 114 may continue to move forward for a time period from the predetermined time T1 to the ABS control end time T2.

Accordingly, during the ABS Fade out period TABS, the hydraulic piston 114 may not change its movement direction so that noise caused by mechanical friction may be reduced.

Also, the controller 330 may determine a stroke value (Sz) range of the hydraulic piston 114 at the predetermined time T1.

More specifically, the controller 330 may determine a stroke value (Sz) range of the hydraulic piston 114, based on a total stroke value that is to be consumed for a time period from when an ABS control starts to when the ABS control terminates, wherein the total stroke value may be calculated by Equation 1 expressed above.

At this time, the controller 330 may determine different stroke value (Sz) ranges of the hydraulic piston 114 at the predetermined time T1 according to when the hydraulic piston 114 moves forward upon reaching the predetermined time T1 and when the hydraulic piston 114 moves backward upon reaching the predetermined time T1.

Also, the controller 330 may determine target speed and a target stroke value, and change the movement direction of the hydraulic piston 114 based on the target speed and the target stroke value such that the position of the hydraulic piston 114 reaches the target stroke value.

More specifically, the controller 330 may calculate a position (stroke value) trajectory of the hydraulic piston 114 according to vehicle speed, from a total stroke value that is to be consumed for a time period from when an ABS control starts to when the ABS control terminates, wherein the total stroke value may be calculated by Equation 1 expressed above. The controller 330 may control a movement of the hydraulic piston 114 such that the stroke value of the hydraulic piston 114 reaches the target stroke value at the target speed, by using the calculated trajectory according to vehicle speed.

In other words, the controller 330 may control a movement of the hydraulic piston 114 to change the movement direction of the hydraulic piston 114 such that the stroke value of the hydraulic piston 114 reaches the target stroke value at the target speed.

For example, the controller 330 may set the target speed to speed of when an ABS Fade out period TABS starts, and set the target stroke value to the stroke value Sz. The controller 330 may calculate a stroke value trajectory according to speed from an estimated total stroke value, and control the hydraulic piston 114 to change its movement direction at a stroke value Sx such that the stroke value of the hydraulic piston 114 at the target speed becomes the target stroke value Sz.

FIG. 6 is a flowchart showing a method of controlling the electric brake system 1 according to an embodiment of the disclosure.

The controller 330 may determine whether an ABS control operates, in operation 810. When an ABS control starts by an ABS apparatus (YES in operation 810), the controller 330 may determine predicted displacement information of the hydraulic piston 114 while the ABS control is performed, in operation 820.

The predicted displacement information may be information about a total movement amount of the hydraulic piston 114, which is predicted while the ABS control is performed. The predicted displacement information may include total stroke value information of the hydraulic piston 114 while the ABS control is performed. More specifically, the controller 330 may determine a total stroke value for a time period from when the ABS control starts to when the ABS control terminates.

More specifically, the controller 330 may determine a total stroke value based on a change in stroke values for a unit time, a change in vehicle speed for the unit time, and currently sensed vehicle speed.

After the total stroke value is determined, the controller 330 may control the hydraulic piston 114 to be positioned within a predetermined forward surplus stroke range in an ABS Fade out period, in operation 830.

Thereby, the controller 330 may prevent a movement direction of the hydraulic piston 114 from changing in the ABS Fade out period, to improve stroke use efficiency (a ratio of boosted pressure to a consumed stroke).

According to the electric brake system and the method of controlling the same as described above, because the movement direction of the piston does not change in the ABS Fade out period, the stroke use efficiency can be improved, and accordingly, noise caused by mechanical friction can be reduced.

So far, the disclosed embodiments have been described with reference to the accompanying drawings. The aforementioned descriptions are only for illustrative purposes, and it will be apparent that those skilled in the art can make various modifications thereto without changing the technical spirit and essential features of the present disclosure. Thus, it should be understood that the exemplary embodiments described above are merely for illustrative purposes and not for limitation purposes in all aspects.

Meanwhile, the disclosed embodiments may be implemented in the form of a recording medium storing instructions that can be executed by a computer. The instructions may be stored in the form of program codes, and when executed by a processor, the instructions may create a program to perform operations of the disclosed embodiments. The recording medium may be implemented as a computer-readable recording medium.

The computer-readable recording medium may include all kinds of recording media that can be interpreted by a computer. For example, the computer-readable recording medium may be Read Only Memory (ROM), Random Access Memory (RAM), a magnetic tape, a magnetic disc, a flash memory, an optical data storage, or the like.

What is claimed is:

1. An electric brake system comprising:
a hydraulic feeder configured to move a piston forward or backward according to a pedal effort from a brake pedal to discharge oil;
a motor position sensor configured to measure a position of the piston; and
a controller configured to, when an Anti-lock Brake System (ABS) control starts, control a change in direction of the piston such that the piston positions at a target position at target vehicle speed based on predicted displacement information of the piston, determined based on at least one of the measured position of the piston or a speed of a vehicle, while the ABS control is performed, wherein the controller controls the piston to change a movement direction last before a predetermined time set to be prior to termination of the ABS control.

2. The electric brake system of claim 1, wherein when the ABS control starts, the controller determines a total stroke value of the piston for a time period from when the ABS control starts to when the ABS control terminates, as the predicted displacement information.

3. The electric brake system of claim 1, wherein the controller calculates a position trajectory of the piston according to the speed of the vehicle based on the predicted displacement information, and controls the change in direction of the piston based on the position trajectory of the piston such that the piston is at the target position at the target vehicle speed.

4. The electric brake system of claim 1, wherein the controller determines the predicted displacement information of the piston, based on a change in position of the piston measured for a predetermined unit time and a change in the speed of the vehicle sensed for the predetermined unit time.

5. The electric brake system of claim 1, wherein the controller controls the piston such that the piston is positioned within a predetermined forward surplus stroke range at the predetermined time.

6. The electric brake system of claim 1, wherein the controller controls the piston to move in one direction of forward or backward until the ABS control terminates from the predetermined time.

7. A method of controlling an electric brake system, comprising:
sensing a speed of a vehicle;
measuring a position of a piston;
determining predicted displacement information of the piston while an Anti-lock Brake System (ABS) control is performed;
determining target vehicle speed and a target position of the piston; and controlling a change in direction of the piston such that the piston positions at the target position at the target vehicle speed based on the predicted displacement information, determined based on at least one of the measured position of the piston or the sensed speed of the vehicle, wherein the controlling of the piston comprises controlling the piston to change a movement direction last before a predetermined time prior to termination of the ABS control.

8. The method of claim 7, wherein the determining of the predicted displacement information of the piston comprises determining, when the ABS control starts, a total stroke value of the piston for a time period from when the ABS control starts to when the ABS control terminates, as the predicted displacement information.

9. The method of claim 7, wherein the controlling of the piston comprises:
calculating a position trajectory of the piston according to the sensed speed of the vehicle based on the predicted displacement information; and
controlling a change in direction of the piston based on the position trajectory of the piston such that the piston is at the target position at the target vehicle speed.

10. The method of claim 7, wherein the determining of the predicted displacement information of the piston comprises determining the predicted displacement information of the piston based on a change in position of the piston measured for a predetermined unit time and a change in the sensed speed of the vehicle for the predetermined unit time.

11. The method of claim 7, wherein the controlling of the piston comprises controlling the piston such that the piston is positioned within a predetermined forward surplus stroke range at the predetermined time.

12. The method of claim 7, wherein the controlling of the piston comprises controlling the piston to move in one direction of forward or backward until the ABS control terminates from the predetermined time.

* * * * *